(12) United States Patent
Jeong et al.

(10) Patent No.: US 11,993,184 B2
(45) Date of Patent: May 28, 2024

(54) VEHICLE SEAT MONOPOST ASSEMBLY AND ROTATABLE AND HEIGHT ADJUSTABLE VEHICLE SEAT MOUNTED THEREON

(71) Applicants: Hyundai Motor Company, Seoul (KR); Kia Corporation, Seoul (KR); DAS CO., LTD, Gyeongsangbuk-do (KR)

(72) Inventors: Dong Woo Jeong, Gyeonggi-do (KR); Sang Ho Kim, Incheon (KR); Seon Chae Na, Gyeonggi-do (KR); Jae Hwan Lee, Gyeonggi-do (KR); Ji Yong Park, Gyeonggi-do (KR)

(73) Assignees: Hyundai Motor Company, Seoul (KR); Kia Corporation, Seoul (KR); DAS CO., LTD, Gyeongsangbuk-do (KR)

( * ) Notice: Subject to any disclaimer, the term of this patent is extended or adjusted under 35 U.S.C. 154(b) by 0 days.

(21) Appl. No.: 17/978,042

(22) Filed: Oct. 31, 2022

(65) Prior Publication Data

US 2023/0173955 A1 Jun. 8, 2023

(30) Foreign Application Priority Data

Dec. 6, 2021 (KR) .......................... 10-2021-0172879

(51) Int. Cl.
*B60N 2/16* (2006.01)
*B60N 2/005* (2006.01)
*B60N 2/02* (2006.01)
*B60N 2/14* (2006.01)

(52) U.S. Cl.
CPC ......... *B60N 2/164* (2013.01); *B60N 2/02246* (2023.08); *B60N 2/146* (2013.01); *B60N 2/005* (2013.01)

(58) Field of Classification Search
CPC .... B60N 2/02253; B60N 2/165; B60N 2/164; B60N 2/02246; B60N 2/1635
USPC ............... 297/344.18, 344.2, 344.23, 344.22
See application file for complete search history.

(56) References Cited

U.S. PATENT DOCUMENTS

| | | | | |
|---|---|---|---|---|
| 2013/0276678 A1* | 10/2013 | Greenwood | ........... | F16M 11/20 108/147 |
| 2017/0057388 A1* | 3/2017 | Vikstrom | ............. | B60N 2/1853 |
| 2020/0223379 A1 | 7/2020 | Kikkawa | | |

FOREIGN PATENT DOCUMENTS

| | | | | |
|---|---|---|---|---|
| CN | 112140951 A | * | 12/2020 | ............... B60N 2/16 |
| JP | H10278639 A | | 10/1998 | |
| KR | 20-1999-0004357 U | | 2/1999 | |
| KR | 10-0554104 B1 | | 2/2006 | |

(Continued)

*Primary Examiner* — Milton Nelson, Jr.
(74) *Attorney, Agent, or Firm* — Fox Rothschild LLP

(57) ABSTRACT

Proposed are a vehicle seat monopost assembly and a vehicle seat mounted thereon. In one aspect, a drive part includes a housing mounted on a lower frame connected to a vehicle body and a first engagement part configured to be rotated by a drive source. A second engagement part suitably may include a thread configured to be engaged with the first engagement part and a cylindrical body configured to be fixed to a vehicle seat frame. A connecting sleeve part is seated on the drive part and has an inner space into which the lead screw part is fitted. The connecting sleeve part is configured to restrict a rotation in response to an operation of a rotation restricting member.

17 Claims, 13 Drawing Sheets

(56) References Cited

FOREIGN PATENT DOCUMENTS

| KR | 10-0589431 B1 | 6/2006 |
| KR | 10-2011-0034142 A | 4/2011 |
| KR | 10-2020-0021618 A | 3/2020 |

\* cited by examiner

VEHICLE SEAT MONOPOST ASSEMBLY AND ROTATABLE AND HEIGHT ADJUSTABLE VEHICLE SEAT MOUNTED THEREON

CROSS REFERENCE TO RELATED APPLICATION

The present application claims priority to Korean Patent Application No. 10-2021-0172879, filed Dec. 6, 2021, the entire contents of which are incorporated herein for all purposes by this reference.

1. Field

The present disclosure relates, generally, to a vehicle seat having a swivel function and, more particularly, to a vehicle seat having a seat height adjustment function and a swivel function.

2. Background

With gradual development of autonomous driving technology, the degree of freedom of the movement of an occupant in a vehicle also increases. Thus, the development of a seat structure prepared for a variety of seating scenarios of an occupant is required. In particular, with the development of autonomous driving technology, a seat structure focused on rest rather than driving is required. For example, a swivel function for rotating a seat for a conversation between occupants is required. In addition, seats used in conventional vehicles respectively include a variety of functions, such as forward and backward sliding, tilting, and up-down height adjustment.

In the development of an operating mechanism allowing the above-described function of the conventional seat to be provided in application of the swivel function for rotating the seat, the complexity or enlargement of the structure may cause some problems such as an insufficient cabin space.

In the meantime, in the related art, a device only having one of the seat height adjustment function and the swivel function is typically mounted on the seat. For example, a conventional seat height adjustment device uses a four-bar link structure. When this four-bar link structure is used together with the swivel device, there are problems such as the complicated overall structure and increased costs. In addition, due to a large number of link structures, BSR noise or the like is generated by movement or the like. Furthermore, when both the seat height adjustment function and the swivel function are used, the height of the seat is increased due to the complicated structure, thereby disadvantageously increasing the size of a cushion part of the seat.

Therefore, in the use of a cabin space of an autonomous vehicle, a swivel function for rotating the seat and the design of a slim monopost frame for realizing the swivel function are required in order to maximize the feeling of openness and seating scenarios applicable in the vehicle.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a vehicle seat monopost assembly and a vehicle seat mounted thereon, wherein the monopost assembly is realizable by a monopost structure in which both a seat swivel function and a seat height adjustment function are integrated.

Also provided is a vehicle seat monopost assembly having a simple structure in place of a complicated link structure of the related art. The monopost assembly is intended to improve the feeling of openness of the cabin of the vehicle and maximize the utilization of the cabin space.

Also provided is an integrated vehicle seat monopost assembly according to an exemplary embodiment, wherein both rotation and height adjustment can be performed using a single drive source and both the swivel function and the height adjustment function may be realized due to the rotation and the height adjustment.

In one aspect, a vehicle seat monopost assembly is provided that may suitably comprise: a) a drive part comprising a housing mounted on a lower frame configured to be connected to a vehicle body and a first engagement part; b) a second engagement part configured to be engaged with the first engagement part and configured to be affixed to a vehicle seat frame; and c) a connecting sleeve part seated on the drive part and having an inner space into which the second engagement part is fitted. In certain aspects, the vehicle seat assembly may further comprise a rotation restricting member. Suitably, the connecting sleeve part is configured to restriction a rotation in response to an operation of the rotation restricting member. Suitably, the first and second engagement parts are adapted to mate to provide an engagement. In a preferred aspect, the first engagement part is a nut and the second engagement part if a screw.

In a further aspect, a vehicle seat monopost assembly is provided that may suitably comprise: a drive part including a housing mounted on a lower frame connected to a vehicle body and a lead nut configured to be rotated by a drive source; a lead screw part including a thread configured to be engaged with the lead nut and a cylindrical body configured to be fixed to a vehicle seat frame; and a connecting sleeve part seated on the drive part and having an inner space into which the lead screw part is fitted. The connecting sleeve part may be configured to restrict a rotation in response to an operation of the rotation restricting member.

The lead screw part is configured to be allowed to move in a vertical direction in the connecting sleeve part by a guide member.

When the rotation restricting member restricts rotation of the connecting sleeve part, the lead screw part may be moved upward in the connecting sleeve part in response to rotation of the lead nut. When the rotation restricting member allows the connecting sleeve part to rotate, both the connecting sleeve part and the lead screw part may rotate during rotation of the lead nut.

The guide member may include a key extending in a vertical direction on a cylindrical body of the lead screw part. The connecting sleeve part may have a key recess formed in an inner surface to be coupled to the key.

The lead nut may include a seating surface formed by a flange extending outward from a lower portion of the lead nut. The connecting sleeve part may include a flange surface formed on a lower portion of the connecting sleeve part and extending outward. The flange surface may be in contact with the seating surface such that the lead nut supports the connecting sleeve part.

The housing of the drive part may include a housing cover facing the flange surface around the seating surface of the lead screw the housing cover. The rotation restricting member may include a fixing pin disposed on the housing cover so as to be exposable while moving up and down. The fixing pin may be inserted into one of a plurality of fastening holes formed in the flange surface to restrict the rotation of the connecting sleeve part.

The plurality of fastening holes may be formed in the flange surface and spaced apart from each other by predetermined distances which are set to be minimum angles of rotation of the vehicle seat.

The outer surface of the housing cover may be spaced apart from the flange surface by a predetermined distance.

The vehicle seat monopost assembly may further include: a drive motor configured to rotate the connecting sleeve part; and a drive gear configured to be rotated by the drive motor. The connecting sleeve part may include a driven gear configured to be engaged with the drive gear.

The derive motor and the drive gear may be configured to be positioned adjacent to a side portion of the drive part.

The drive motor and the drive gear may be configured to be attached to a side portion of the drive part.

According to the vehicle seat monopost assembly and the vehicle seat mounted thereon according to the present disclosure, it is possible to realize both the seat swivel function and the height adjustment function using the integrated monopost structure. The number of components and costs may be reduced due to the simplification of the lower structure of the seat. In addition, the lower structure of the seat may be designed into a graceful and slim profile.

In addition, according to the present disclosure, the lower part of the vehicle may only be comprised of the monopost structure. Thus, it is possible to maximize the feeling of openness of the vehicle cabin space and significantly increase the utilization of the vehicle cabin space.

Furthermore, according to the present disclosure, as the monopost assembly is applied to the lower part of a vehicle seat including the driver's seat, it is advantageously possible to precisely control the angle of rotation and height of the seat by controlling the motor.

In additional aspects, vehicles are provided that comprises a seat and seat assembly as disclosed herein.

Thus, in one aspect, a vehicle is provided that comprises A vehicle seat monopost assembly comprising: a) a drive part comprising a housing mounted on a lower frame configured to be connected to a vehicle body and a first engagement part; b) a second engagement part configured to be engaged with the first engagement part and configured to be affixed to a vehicle seat frame; and c) a connecting sleeve part seated on the drive part and having an inner space into which the second engagement part is fitted. In certain aspects, the vehicle seat assembly may further comprise a rotation restricting member. Suitably, the connecting sleeve part is configured to restriction a rotation in response to an operation of the rotation restricting member. Suitably, the first and second engagement parts are adapted to mate to provide an engagement. In a preferred aspect, the first engagement part is a nut and the second engagement part if a screw.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

As referred to herein, a monopost seat assembly or monopost seat or other similar term refers to a captain's-type vehicle seat rather than a bench-type vehicle seat or seat assembly. In certain aspects, a monopost vehicle seat may not have a seat-collapsing hinge as provided with a bench-type vehicle seat.

Other aspects are disclosed infra.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
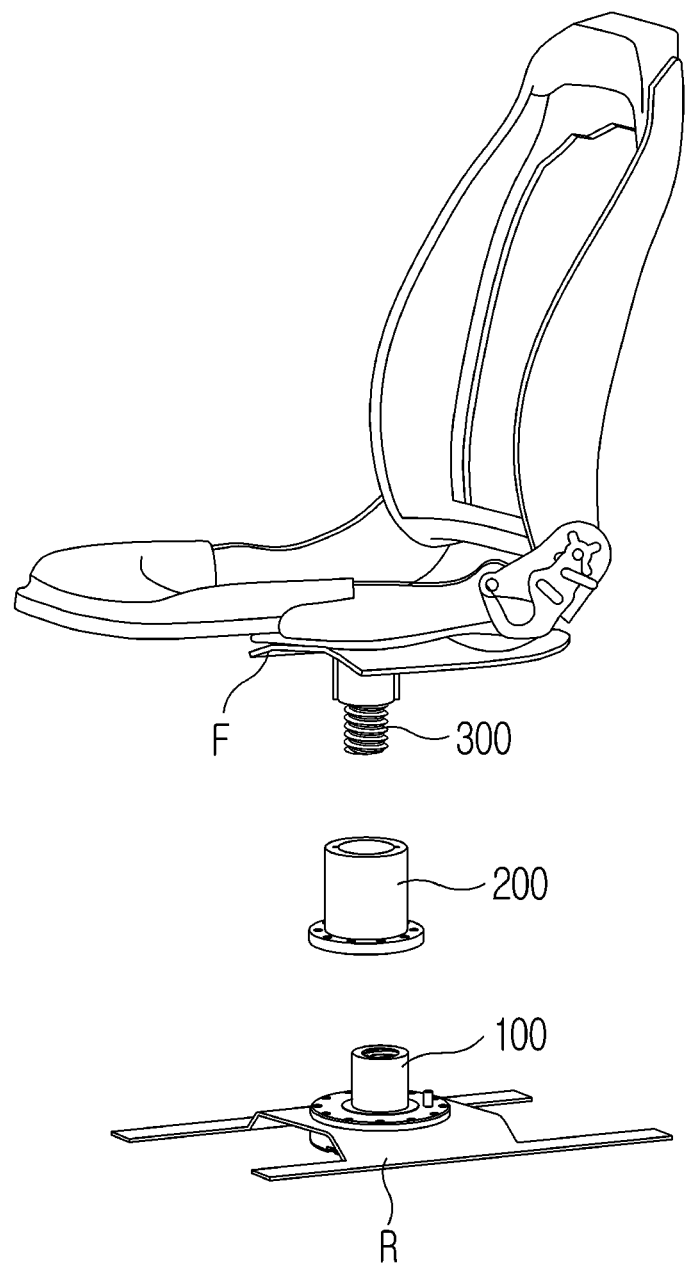
FIG. 1 is an exploded perspective view illustrating key components of a vehicle seat monopost assembly according to an embodiment of the present disclosure, in which the components are mounted on a vehicle inner frame and a seat frame.

It is understood that the term "vehicle" or "vehicular" or other similar term as used herein inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a vehicle seat monopost assembly and a vehicle seat including the same according to a variety of embodiments of the present disclosure are disclosed.

FIG. 1 is an exploded perspective view illustrating key components of a vehicle seat monopost assembly according to an embodiment of the present disclosure, in which the components are mounted on a vehicle inner frame and a seat frame F.

As illustrated in FIG. 1, the vehicle seat monopost assembly according to an exemplary embodiment of the present disclosure is suitably configured such that a drive part 100 on one side is fixed to a lower frame R connected to a vehicle body side and a lead screw part 300 on the other side is mounted on the seat frame F connected to a vehicle seat. According to this configuration, the vehicle may be mounted on a vehicle body using the monopost assembly.

The lower frame R is configured to fix the vehicle seat to the vehicle body. For example, the lower frame R may be a seat rail slidably mounted on the vehicle body.

The vehicle seat may be mounted on the seat frame F, and the monopost assembly may be mounted on the seat frame F using a fixing member such as a bolt.

Figure 3:
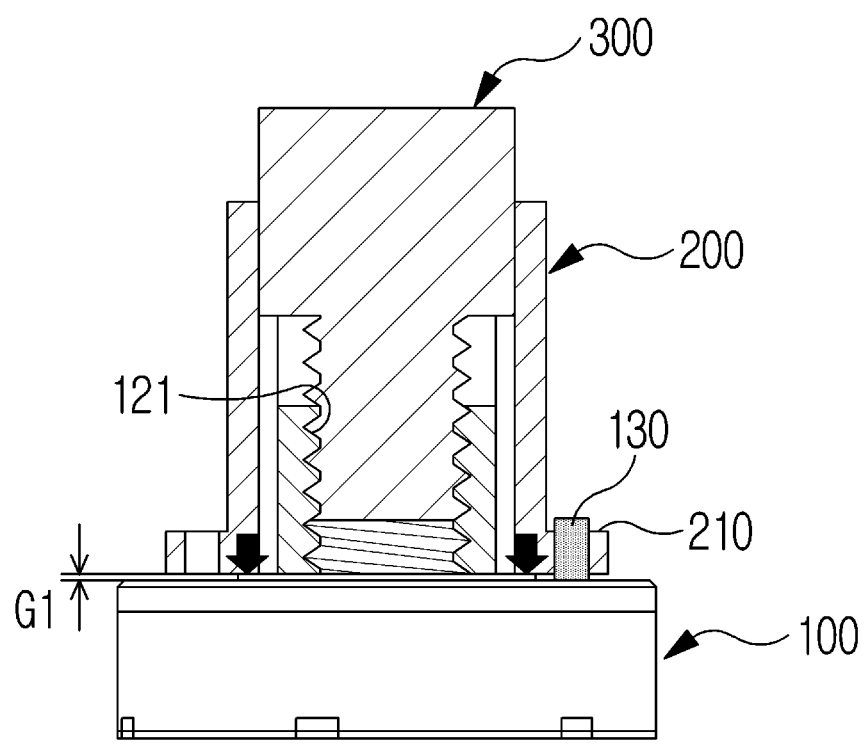
FIG. 3 is a cross-sectional view of the monopost assembly monopost assembly according to an embodiment of the present disclosure.

In FIG. 1, the lead screw part 300, a connecting sleeve part 200, and the drive part 100 are illustrated in an exploded view. The respective components may be fitted together, as illustrated in FIG. 3, such that the vehicle seat may be fixed to the vehicle body.

The specific configuration of the vehicle seat monopost assembly according to an exemplary embodiment of the present disclosure will be described in detail with reference to FIGS. 2 and 3. Here, FIG. 2 is an exploded perspective view of the monopost assembly monopost assembly according to an embodiment of the present disclosure, and FIG. 3 is a cross-sectional view of the monopost assembly monopost assembly according to an embodiment of the present disclosure.

Figure 2:
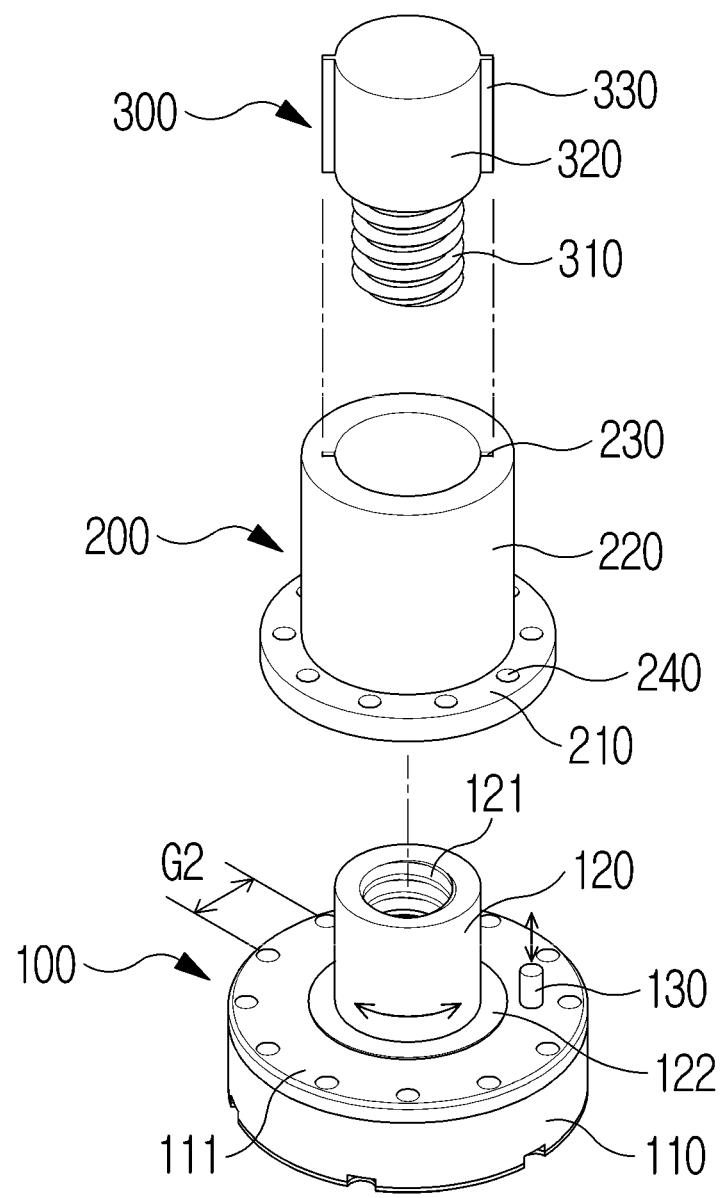
FIG. 2 is an exploded perspective view of the monopost assembly monopost assembly according to an embodiment of the present disclosure.

Referring to FIG. 2, the vehicle seat monopost assembly lead screw part 300 according to the present disclosure may include three parts comprised of the lead screw part 300, the connecting sleeve part 200, and the drive part 100. Specifically, the drive part 100 is mounted on the lower frame R connected to the vehicle body shaft, and may include a housing 110 and a lead nut 120. A drive source for rotating the vehicle seat may be provided in the housing 110, and the housing 110 may be a cover for protecting the drive source. The housing 110 may be mounted on the lower frame R, or as illustrated in FIGS. 1 and 2, be fixed on top of the seat frame F by a housing cover 111.

The housing cover 111 may have a ring-shaped disc structure, in which the lead nut 120 may be exposed through a central hole of the housing cover 111. In FIG. 2, a plurality of bolts is depicted as being disposed in the outer peripheral portions of the housing cover 111. The housing cover 111 may be fixed to the seat frame F using the bolts.

The drive source is configured to provide driving force for rotating the seat or adjusting the height of the seat. Particularly, the drive source may be a drive motor. In addition, the housing 110 may be a cover protecting the rotor and the stator of the drive motor.

The lead nut 120 is configured to be screw-engaged with the lead screw part 300 to be described later. The lead nut 120 may have a nut structure, in which a thread 121 is formed on the inner circumferential portion. In addition, the lead nut 120 is configured to be rotated by the drive source. Particularly, the lead nut 120 may be configured to be coupled to the rotating shaft of the drive motor serving as the drive source so as to be rotatable in response to rotation of the drive motor.

The lead nut 120 has a seating surface 122 formed by a flange extending outward from the lower portion of the lead nut 120. A flange surface 210 extending outward from the lower surface of the connecting sleeve part 200 may be seated on the seating surface 122. In particular, the seating surface 122 is formed to be in contact with the flange surface 210 of the connecting sleeve part 200, and the weight of the vehicle seat serves as a load on the lead nut 120. The portions indicated with arrows in FIG. 3 represent that the flange surface 210 of the connecting sleeve part 200 and the seating surface 122 of the lead nut 120 are in contact with each other as well as the transfer of the load toward the lead nut 120 through the contact.

Thus, as the lead nut 120 is rotated by the drive source in a state in which the seating surface 122 of the lead nut 120 is in contact with the flange surface 210 of the connecting sleeve part 200, the connecting sleeve part 200 may also be rotated. As illustrated in FIG. 3, the housing cover surface may be spaced apart from the flange surface 210 a predetermined gap G1. Due to the gap G1, the housing cover surface interferes with the flange surface 210, and only the flange surface 210 and the seating surface 122 of the lead nut 120 may be in contact with each other. As the flange surface 210 is in contact with the seating surface 122, the lead nut 120 may be configured to support the load of the seat while supporting the connecting sleeve part 200.

In addition, the vehicle seat monopost assembly according to an exemplary embodiment of the present disclosure includes the lead screw part 300 screw-engaged with the lead nut 120 of the drive part 100.

The lead screw part 300 may include a thread 310 allowing the lead screw part 300 to be screw-engaged with the lead nut 120 and a cylindrical body 320 configured to be fixed to the seat frame F.

In addition, the vehicle seat monopost assembly according to an exemplary embodiment of the present disclosure includes the connecting sleeve part 200 seated on the drive part 100 and has defined therein an inner space into which the lead screw part 300 is fitted.

As illustrated in FIG. 3, the connecting sleeve part 200 is configured to be seated on the seating surface 122 of the lead nut 120 to be in contact with the lead nut 120 and receive therein a portion of the lead nut 120 and a portion of the lead screw part 300. In this regard, the connecting sleeve part 200 may include a hollow cylinder 220 having an inner space.

In the meantime, in the seat monopost assembly according to the present disclosure vehicle, both a swivel function for rotating the seat and a seat-height adjustment function for adjusting the height of the seat should be obtained simultaneously. In order to realize a mechanism for such rotation and vertical up-down movement, a guide member and a rotation restricting member may be included.

In particular, the guide member is configured to guide the vertical movement of the lead screw part 300. Thus, the lead screw part 300 is configured to be only allowed to move in the vertical direction in the connecting sleeve part 200 by the guide member, and the connecting sleeve part 200 is configured to restrict a rotation in response to the operation of the rotation restricting member.

Specifically, when the rotation restricting member operates to allow the rotation of the connecting sleeve part 200, both the connecting sleeve part 200 and the lead screw part 300 may rotate to realize a seat swivel function in response to the rotation of the lead nut 120. In contrast, when the rotation restricting member restricts the rotation of the connecting sleeve part 200, the lead screw part 300 may be moved upward in the connecting sleeve part 200 by the guide member in response to the rotation of the lead nut 120, thereby realizing the seat height adjustment function.

In this regard, the guide member may be a key 330 vertically extending on the cylindrical body 320 of the lead screw part 300, and a key recess 230 configured to be coupled to the key 330 may be formed in the inner surface of the connecting sleeve part 200. The key 330 of the lead screw part 300 may be inserted into the key recess 230 formed in the connecting sleeve part 200 and guided upward by the key recess 230. That is, the lead screw part 300 may be guided in the connecting sleeve part 200 surrounding the lead screw part 300 by the key recess 230 so that the rotation of the lead screw part 300 with respect to the connecting sleeve part 200 is restricted and only the vertical up-down movement of the lead screw part 300 is allowed.

In addition, the rotation restricting member may be a fixing pin 130 that is disposed on the housing cover 111 so as to be exposable while being movable up and down. In addition, a plurality of fastening holes 240 may be formed in the flange surface 210 of the connecting sleeve part in order to restrict the rotation of the connecting sleeve part 200 using this fixing pin 130.

Specific examples of the fixing pin 130 and the fastening holes 240 are illustrated in FIGS. 2 and 3. Referring to FIGS. 2 and 3, the fixing pin 130 may be a plate-shaped member that may be exposed externally through the hole in the housing cover 111. As in FIG. 3, the fixing pin 130 is movable up and down. In the case of upward movement, the fixing pin 130 may be sufficiently exposed to the outside of the housing cover 111 and fitted into a corresponding hole of the fastening holes 240 of the flange surface 210. In addition, in the case of downward movement, the fixing pin 130 may be sufficiently covered with the housing cover 111 so as not to interfere with the fastening holes 240.

In order to realize the operating mechanism for upward and downward movement of the fixing pin 130, the fixing pin 130 may have a variety of structures. For example, a variety of applicable structures may include a structure for moving the fixing pin 130 up and down using drive force of a motor, a structure using an elastic member, and the like. These structures may be received in the housing 110. The fixing pin 130 is configured to be fastened to or unfastened from the fastening holes 240 while moving up and down. The fixing pin 130 may be configured such that the upward and downward movement thereof is linked to a swivel start or end signal of an occupant.

When the fixing pin 130 serving as the rotation restricting member protrudes out through the fastening holes 240, the rotation of the connecting sleeve part 200 is restricted by the fixing pin 130. In this regard, the fixing pin 130 may be fitted into one of the plurality of fastening holes 240 formed in the flange surface 210. To which one of the fastening holes 240 the fixing pin 130 is fastened may be a factor for determining the current angle of rotation of the seat.

For example, the positional relationship between the fastening holes 240 and the fixing pin 130 corresponds to the positional relationship between the housing 110 of the fixing part and the lead nut 120 of the fixing part, in which the housing 110 is connected to the vehicle body and is not rotatable, and the lead nut 120 has been rotated for the rotation of the seat. This positional relationship may be used to determine the angle of rotation of the seat. Thus, each of the fastening holes 240 may be provided with a sensor therein, the sensor being able to detect whether or not the fastening hole is fastened to the fixing pin 130. The angle of rotation of the seat may be extracted according to the result of detection of the sensor.

The result of extraction of the angle of rotation of the seat may be periodically transferred to a seat operation controller. The seat operation controller may periodically reset the initial position of the drive motor according to the result of extraction transferred, thereby improving the operation error of the drive motor. Thus, in control of the number of revolutions of the drive motor, the occurrence of an error in which the fixing pin 130 is not correctly engaged can be prevented.

In addition, the plurality of fastening holes 240 may be comprised of the fastening holes 240 formed in the flange surface 210 and spaced apart from each other by predetermined distances. As described above, the positions of the fastening holes 240 correspond to angles of rotation of the seat. Distances G2 of the adjacent fastening holes 240 may be set to be minimum angles of rotation of the vehicle seat. The angle of rotation of the seat may be controlled to a value equal to or smaller than the distance of the adjacent fastening holes 240. However, in this case, the fixing pin 130 cannot be fitted into a corresponding one of the fastening holes 240, and thus the height of the seat cannot be adjusted. Therefore, according to an exemplary embodiment of the present disclosure, the seat operation controller may be configured such that the minimum number of revolutions of the drive motor for controlling the rotation of the seat is set to a value matching the minimum angle of rotation determined by the distance G2 of the adjacent fastening holes 240.

Figure 4A:
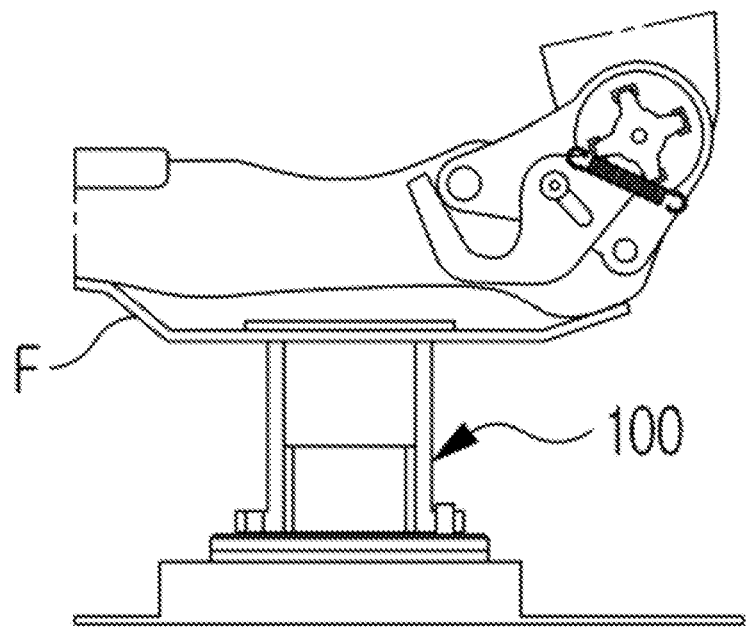
FIGS. 4A and 4B are views illustrating operating states when the height of the seat mounted on the monopost assembly according to an embodiment is adjusted.
Figure 4B:
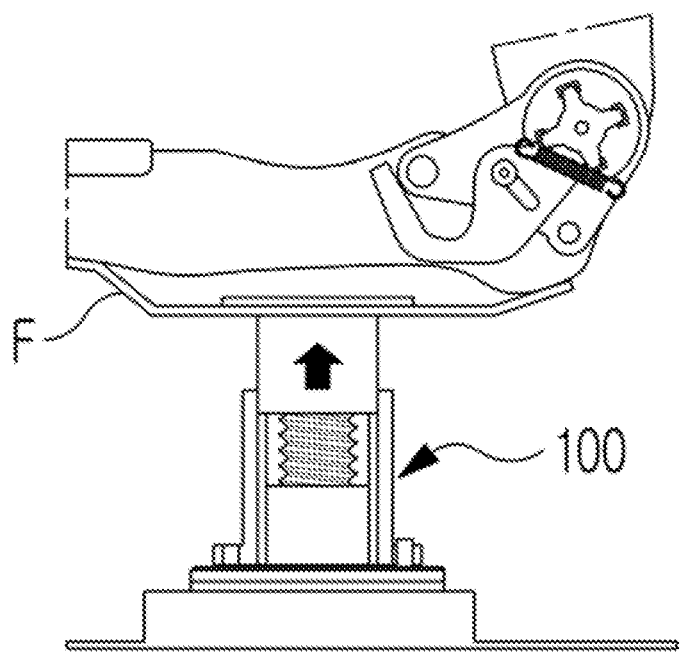
Figure 5A:
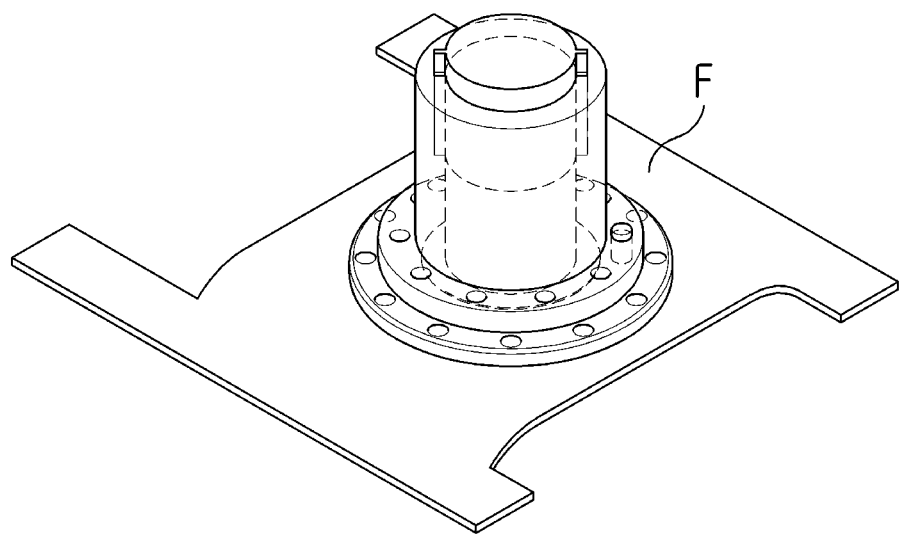
FIGS. 5A and 5B are enlarged views of the components to illustrate the operation of the monopost assembly according to the states of FIGS. 4A and 4B.
Figure 5B:
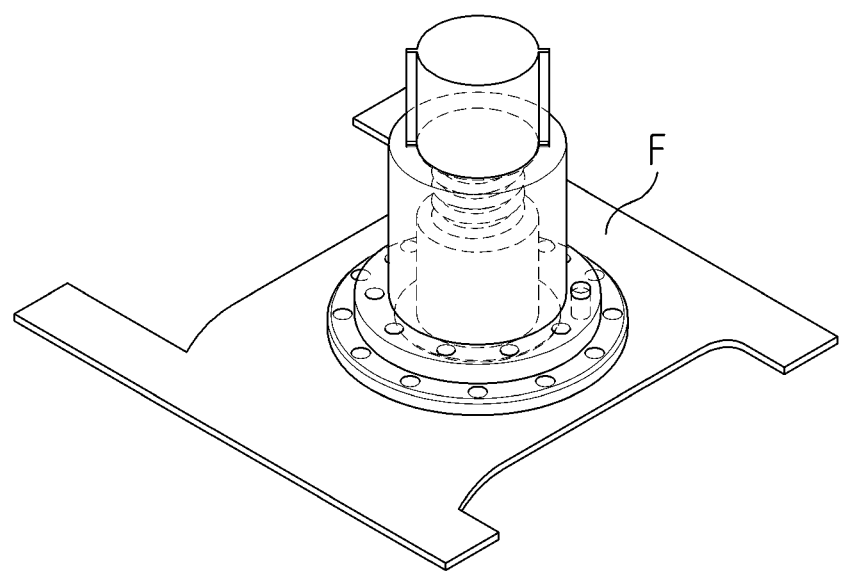

FIGS. 4A, 4B, 5A, and 5B are provided to illustrate an example in which the height of the seat is adjusted by the seat monopost assembly according to the present disclosure vehicle. In particular, FIGS. 4A and 4B are views illustrating operating states when the height of the seat is adjusted, and FIGS. 5A and 5B are enlarged views of the components to illustrate the operation of the monopost assembly according to the states of FIGS. 4A and 4B.

As illustrated in FIGS. 4A to 5B, in a state in which the fixing pin 130 is fitted into one of the fastening holes 240, i.e., the rotation of the connecting sleeve part 200 is restricted, even in the case that the lead nut 120 rotates, the connecting sleeve part 200 does not rotate. In addition, the lead screw part 300 also does not rotate. Thus, in a state in which the fixing pin 130 is moved upward, when the lead nut 120 is rotated in an initial state, as illustrated in FIG. 4A, in which the height of the seat is low, the anti-rotation of the connecting sleeve part 200 obtained by the fixing pin 130 is maintained, as illustrated in FIG. 4B and FIG. 5B, and at the same time, the lead screw part only produces vertical upward (or downward) movement in response to the rotation of the lead nut 120.

In this manner, in a state in which the fixing pin 130 is fastened to the corresponding one of the fastening holes 240, despite the rotation of the lead nut 120, none of the connecting sleeve part 200 and the lead screw part 300 rotates, and the lead screw part 300 is moved vertically upward or downward by the thread 310 of the lead screw part 300 and a guide part (i.e., the key 330 and the key recess 230). Consequently, the seat height adjustment function may be realized.

In contrast, the fixing pin 130 may be sufficiently inserted into the housing cover 111. In this case, the fixing pin 130 is not coupled to any of the fastening holes 240.

Figure 6A:
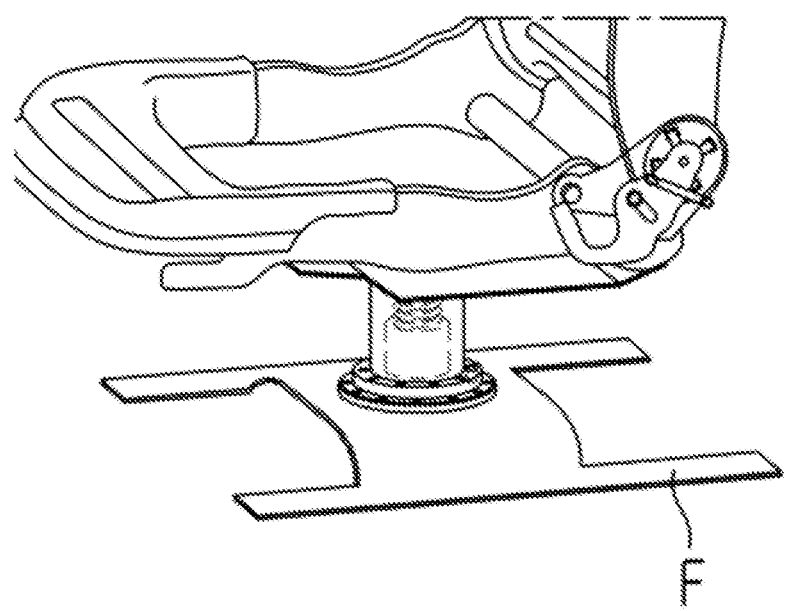
FIGS. 6A and 6B are views illustrating operating states when the vehicle seat including the monopost assembly according to an embodiment of the present disclosure is rotated.
Figure 6B:
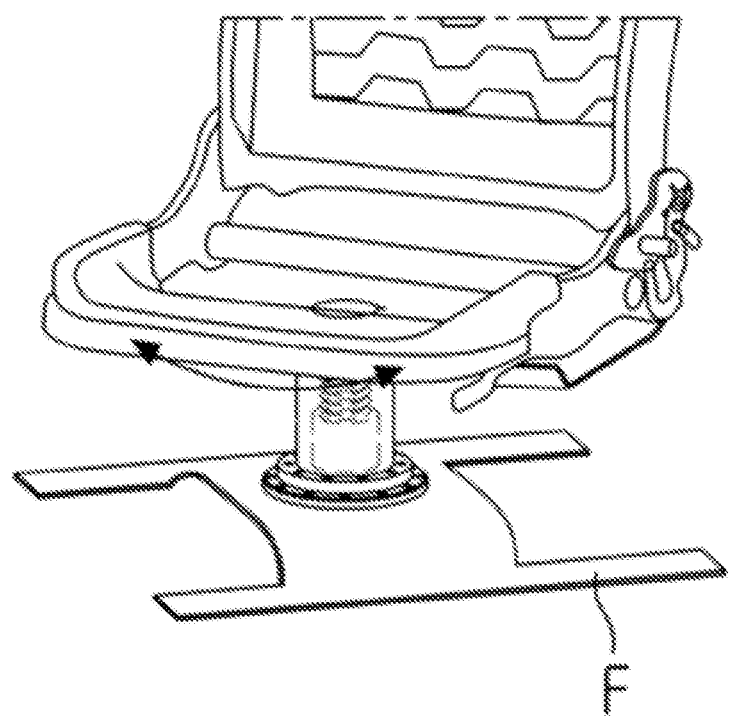
Figure 7A:
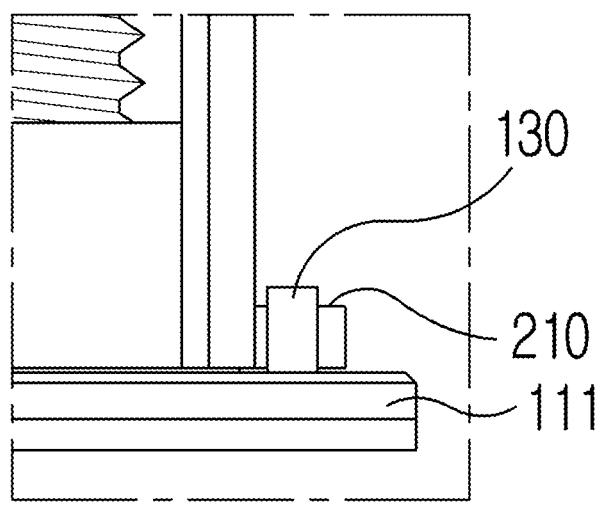
FIGS. 7A to 7C are enlarged views of the components to illustrate the operation of the monopost assembly according to the states of FIGS. 6A and 6B.
Figure 7B:
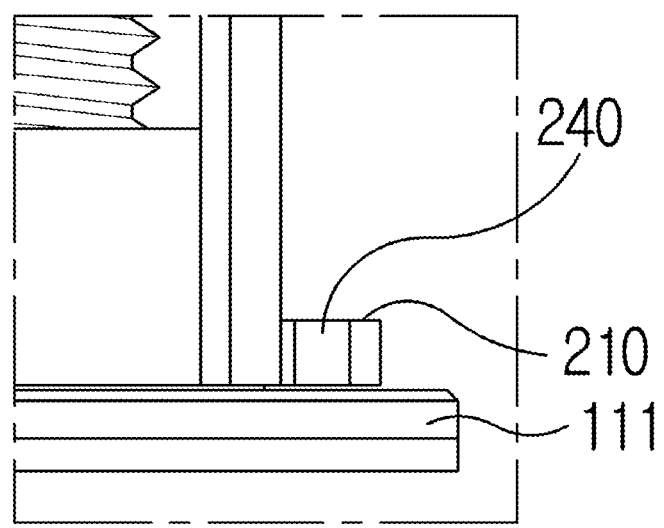
Figure 7C:
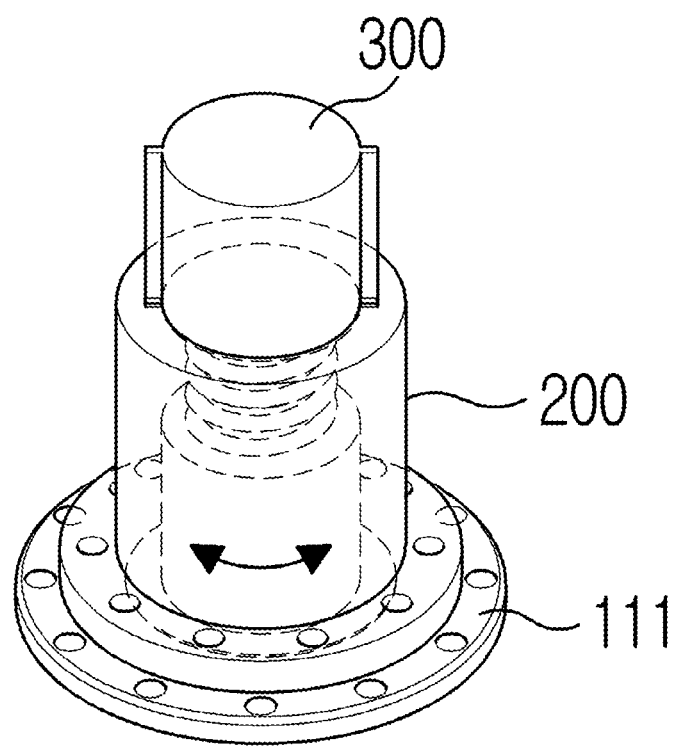

In this regard, FIGS. 6A, 6B, 7A, 7B, and 7C are provided to illustrating the seat swivel function for rotating the vehicle seat. In particular, FIGS. 6A and 6B are views illustrating operating states when the vehicle seat including the monopost assembly according to an embodiment of the present disclosure is rotated, and FIGS. 7A to 7C are enlarged views of the components to illustrate the operation of the monopost assembly according to the states of FIGS. 6A and 6B.

In a normal state in which the seat is in position as in FIG. 6A, a fixed state in which the rotation of the connecting sleeve part 200 is restricted by the fixing pin 130 is maintained as in FIG. 7A.

In addition, as illustrated in FIG. 7B, when the fixing pin 130 is moved downward and is no further coupled to the fastening holes 240 of the connecting sleeve part 200, the rotation of the connecting sleeve part 200 is no further restricted. In this case, when the lead nut 120 is rotated by the drive source, the connecting sleeve part 200 may be rotated together. Since the connecting sleeve part 200 is coupled to the lead screw part 300 through the key recess 230 and the key 330, the lead screw part 300 is also rotated in response to the rotation of the lead nut 120 and the connecting sleeve part 200, as illustrated in FIG. 7C. Thus, in response to the rotation of the lead screw part 300, the vehicle seat mounted on the lead screw part 300 may also be rotated. This may also rotate the lead nut 120 of the drive part 100, as illustrated in FIG. 6B, thereby realizing the swivel function in which the vehicle seat rotates.

Therefore, according to an exemplary embodiment of the present disclosure, it is possible to selectively rotate the seat or restrict the rotation of the seat by operating the fixing pin 130 serving as the rotation restricting member in the top-bottom direction.

Figure 8:
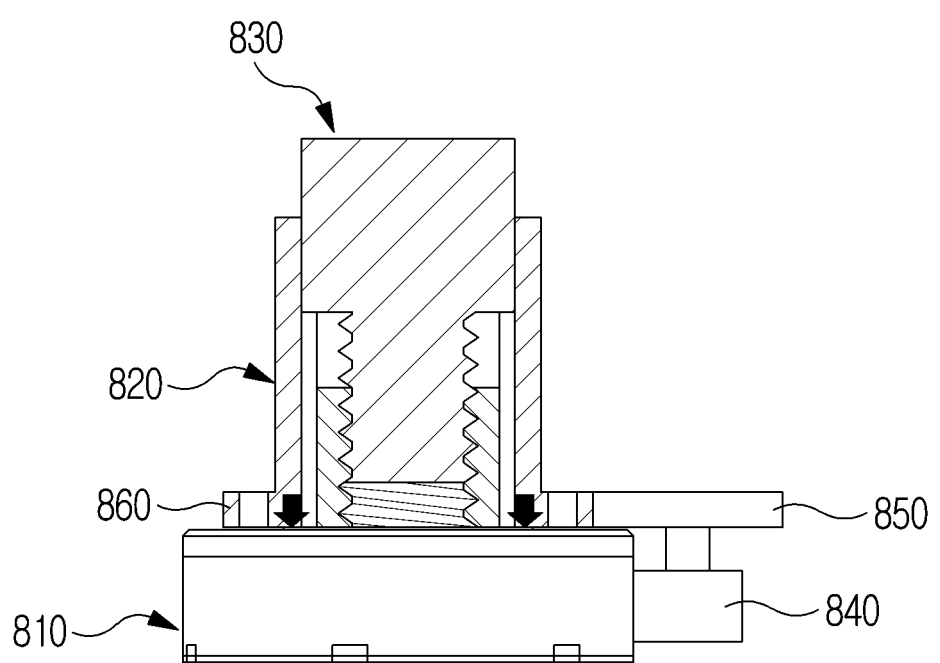
FIG. 8 is a cross-sectional view illustrating a vehicle seat monopost assembly according to another embodiment of the present disclosure.

FIG. 8 is a cross-sectional view illustrating a vehicle seat monopost assembly according to another embodiment of the present disclosure.

The embodiment illustrated in FIG. 8 has the same fundamental configuration as the embodiment illustrated in FIG. 3, and is characterized by including a separate drive source for driving the flange surface 210 of the connecting sleeve part and mechanical elements for transferring drive force.

That is, as illustrated in FIG. 8, a drive motor 840 configured to rotate a connecting sleeve part 820 and a drive gear 850 configured to be rotated by the drive motor may further be included. A driven gear 860 engaged with the drive gear 850 may be provided on the connecting sleeve part. In this regard, the driven gear is configured to be engaged with the drive gear. The driven gear may have teeth on the radial outer circumference of a flange.

For reference, a drive part 810, the connecting sleeve part 820, and a lead screw part 830 are the same components as the drive part 100, the connecting sleeve part 200, and the lead screw part 300 in the embodiment illustrated in FIG. 3, and thus descriptions thereof will be omitted.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A vehicle seat monopost assembly comprising:
   a drive part comprising a housing mounted on a lower frame configured to be connected to a vehicle body and a first engagement part;
   a second engagement part configured to be engaged with the first engagement part and configured to be affixed to a vehicle seat frame; and
   a connecting sleeve part seated on the drive part and having an inner space into which the second engagement part is fitted,
   wherein the first and second engagement parts are adapted to mate to provide an engagement, and
   wherein the first engagement part is a lead nut and the second engagement part is a lead screw part.

2. The vehicle seat monopost assembly of claim 1 further comprising a rotation restricting member.

3. The vehicle seat monopost assembly of claim 2 wherein the connecting sleeve part is configured to restrict a rotation in response to an operation of the rotation restricting member.

4. The vehicle seat monopost assembly of claim 2, wherein, when the rotation restricting member restricts rotation of the connecting sleeve part, the lead screw part is moved upward in the connecting sleeve part in response to rotation of the lead nut, and
   when the rotation restricting member allows the connecting sleeve part to rotate, both the connecting sleeve part and the lead screw part rotate during rotation of the lead nut.

5. A vehicle comprising the vehicle seat monopost assembly of claim 1.

6. The vehicle seat monopost assembly of claim 1, wherein the second engagement part is configured to be allowed to move in a vertical direction in the connecting sleeve part by a guide member.

7. The vehicle seat monopost assembly of claim 6, wherein the guide member comprises a key extending in a vertical direction on a cylindrical body of the lead screw part, and the connecting sleeve part has a key recess formed in an inner surface to be coupled to the key.

8. The vehicle seat monopost assembly of claim 1, wherein the first engagement part comprises a seating surface formed by a flange extending outward from a lower portion of the first engagement part, and the connecting sleeve part comprises a flange surface formed on a lower portion of the connecting sleeve part and extending outward, the flange surface being in contact with the seating surface such that the first engagement part supports the connecting sleeve part.

9. The vehicle seat monopost assembly of claim 8, further comprising a rotation restricting member, wherein the housing of the drive part comprises a housing cover facing the flange surface around a seating surface of the second engagement part, wherein the rotation restricting member comprises a fixing pin disposed on the housing cover so as to be exposable while moving up and down, and wherein the fixing pin is inserted into one of a plurality of fastening holes formed in the flange surface to restrict the rotation of the connecting sleeve part.

10. The vehicle seat monopost assembly of claim 9, wherein the outer surface of the housing cover is spaced apart from the flange surface by a predetermined distance.

11. The vehicle seat monopost assembly of claim 9, wherein the plurality of fastening holes is formed in the flange surface and spaced apart from each other by predetermined distances which are set to be minimum angles of rotation of the vehicle seat frame.

12. The vehicle seat monopost assembly of claim 1, further comprising:

a drive motor configured to rotate the connecting sleeve part; and a drive gear configured to be rotated by the drive motor, wherein the connecting sleeve part comprises a driven gear configured to be engaged with the drive gear.

13. The vehicle seat monopost assembly of claim 12, wherein the drive motor and the drive gear are configured to be attached to a side portion of the drive part.

14. The vehicle seat monopost assembly of claim 12, wherein the drive motor and the drive gear are configured to be positioned adjacent to a side portion of the drive part.

15. A vehicle seat mounted on the vehicle seat monopost assembly of claim 1.

16. A vehicle comprising the vehicle seat of claim 15.

17. The vehicle seat of claim 15, further comprising a rotation restricting member, wherein, when the rotation restricting member restricts rotation of the connecting sleeve part, the lead screw part is moved upward in the connecting sleeve part in response to rotation of the lead nut, thereby adjusting the height of the vehicle seat, and when the rotation restricting member allows the connecting sleeve part to rotate, both the connecting sleeve part and the lead screw part rotate during rotation of the lead nut, thereby rotating the vehicle seat.

* * * * *